PROCESS AND PRODUCT OF COPPER COATING

Filed Feb. 1, 1962

Inventor:
Carlyle S. Herrick,
by James W. Underwood
His Agent.

United States Patent Office 3,148,083
Patented Sept. 8, 1964

3,148,083

PROCESS AND PRODUCT OF COPPER COATING

Carlyle S. Herrick, Alplaus, N.Y., assignor to General Electric Company, a corporation of New York Filed Feb. 1, 1962, Ser. No. 170,425
7 Claims. (Cl. 117—201)

Figure 1:
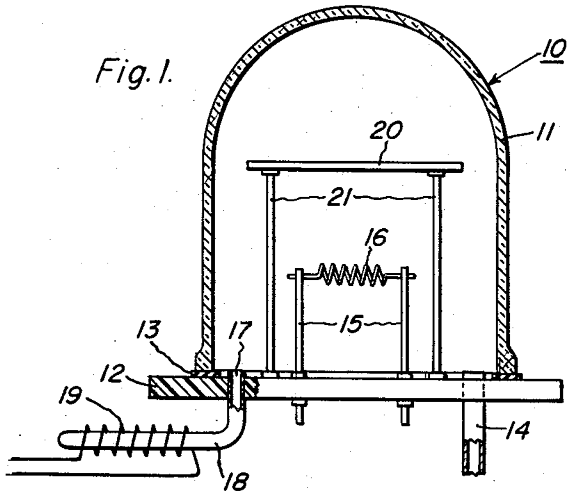

This invention relates to electrically conductive coatings on the surface of a solid substrate and to the process of producing the coatings. More particularly, this invention relates to electrically conductive coatings of cuprous iodide and cuprous sulfide deposited on a solid substrate and to the process of producing such conductive coatings which have increased electrical conductivity as compared to the coatings of the same materials produced by prior known processes.

The production of electrically conductive coatings of cuprous iodide on substrates is described, for example, in U.S. Patent 2,756,165, Lyon. In this process, copper is evaporated onto the substrate in a vacuum of from 0.001 to 1 micron of mercury and the copper film reacted with iodine vapor to form cuprous iodide. Alternatively, the copper may be deposited using the copper mirror technique or cuprous iodide may be preformed and evaporated directly onto the substrate. Depending on the thickness of the deposited layer, the coatings range all the way from transparent thin films up to opaque thick coatings. Following the known laws of light, if the films which are transparent are deposited on transparent substrates, the coated substrates remain transparent providing the thickness of the film is a multiple of the wave length of the incident light that does not cause optical interference due to the differences in index of refraction between the substrate and the deposited layer.

Although these coatings are said to be electrically conductive, their conductivity is low in comparison to metallic conductors such as copper and more properly are classifiable as semiconductive. The conductivity is usually measured by measuring the resistance in ohms per square for thin coatings and usually ranges from 1,000 ohms per square for coatings in the order of 11,000 Angstroms thick to 8,000 to 10,000 ohms per square for films 1375 Angstroms thick. By depositing iodine in excess of the amount required to convert all of the copper in the coating to cuprous iodide, lower resistances are obtained. However, these lower resistances are not stable because the excess iodine readily evaporates from the coating causing the resistance to increase as the excess iodine evaporates, for example, when exposed to air or placed in a vacuum. Furthermore, the resistance of the films is not reproducible and varies quite widely from specimen to specimen, even though the thicknesses of the films are the same.

I have now found that reproducible results as well as lower resistances, i.e., increased conductivity, are obtained in cuprous iodide coatings if the copper is condensed on the substrate in an oxygen atmosphere under vacuum in which the oxygen partial pressure is in the range of $6\times10^{-5}$ to $1\times10^{-2}$ mm. of mercury, and then the copper coating converted to cuprous iodide by exposing the coating to vapors of iodine or hydrogen iodide. I have further found that this increase in conductivity is also obtained if the copper coating is converted to cuprous sulfide by exposing the copper coating to vapors of sulfur or hydrogen sulfide. This increase in conductivity is a factor of at least 2 and may be as high as 5, over films made under the same conditions, except that the copper is deposited in a vacuum without the establishment of an oxygen atmosphere in the vacuum. I have further discovered that the films which are transparent are stabilized against becoming cloudy or aging. Greater stability is obtained from those cuprous iodide or sulfide films produced from copper coatings which were deposited with the greater higher partial pressure of oxygen during the deposition of the copper.

A principal object of the present invention is to provide a surface of a solid substrate with an electrically conducting coating of cuprous iodide or cuprous sulfide.

Another object of this invention is to provide the surface of a solid substrate with an electrically conductive transparent coating of cuprous iodide or cuprous sulfide.

Another object of this invention is to provide the surface of a solid substrate with an electrically conductive coating of cuprous iodide or cuprous sulfide which has a reproducible, low electrical resistance.

Another object of this invention is to provide the surface of a solid substrate with an electrically conductive transparent coating of cuprous iodide or cuprous sulfide which is stabilized against loss of transparency on aging.

Another object of this invention is to provide a new process for condensing a copper film on a solid substrate.

A further object of this invention is to provide a new process for producing an electrically conductive coating of cuprous iodide or cuprous sulfide.

Figure 2:
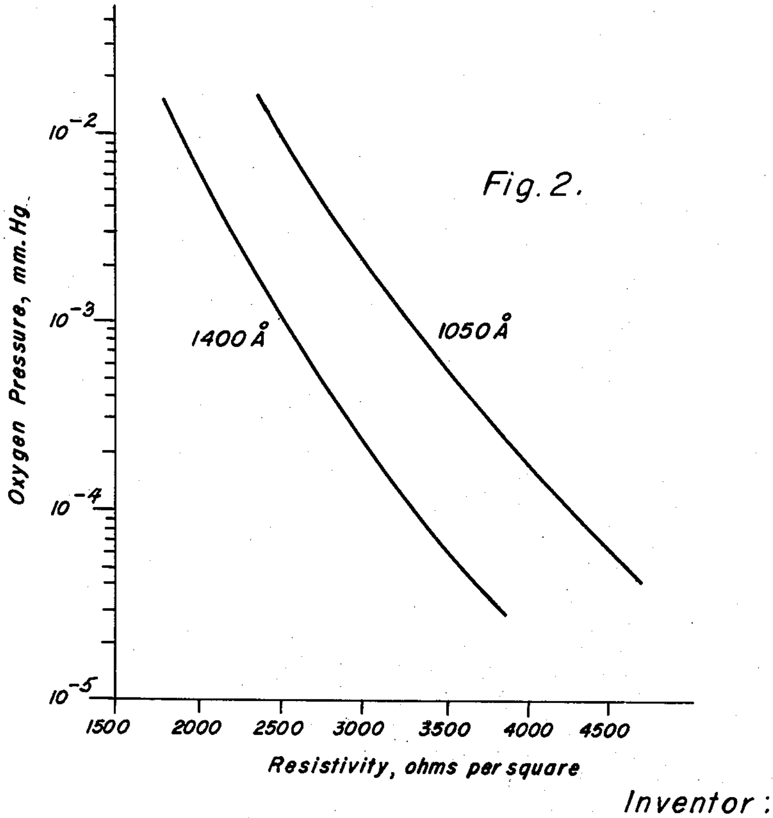

These and other objects of this invention will be more readily understood from the following description taken in connection with the drawing, in which:

FIG. 1 is a cross-sectional view of a typical vacuum apparatus for condensing the copper film on the substrate, and FIG. 2 is a graphical plot of the resistances obtained on two typical thicknesses of film of cuprous iodide as a function of the partial pressure of oxygen in the vacuum apparatus during condensation of the copper coating on the substrate.

In forming the copper on the solid substrate, the most convenient process is by condensation of copper vapor onto the substrate in a vacuum. The condensation of copper onto substrates under vacuum is a well-known technique and is described in detail in such references as "Metallizing of Plastics" by Harold Narcus, Reinhold Publishing Company, New York, 1960, and "Vacuum Deposition of Thin Films" by L. Holland, Chapman and Hall, Ltd., London, 1956. My process differs from that of the prior art in that I provide for a controlled influx or "leak" of oxygen into the vacuum atmosphere so that during the formation of the metal coating it is actually condensed in an oxygen atmosphere. By controlling the oxygen partial pressure of the vacuum in the range of from $6\times10^{-5}$ to $1\times10^{-2}$ mm. of mercury, I find that it is possible to evaporate and condense the copper without causing any visible surface oxidation of the copper to cuprous oxide. The coating still retains the appearance and conductivity of a metallic copper coating. However, there apparently is oxygen incorporated into the copper coating in some form which cannot, at present, be accurately determined. It may be in the form of occluded oxygen, actual incorporation of oxygen in the copper crystal lattice without the oxygen actually chemically combining with the copper, or it may be in the form of individual cuprous oxide molecules completely surrounded by copper atoms. If the partial pressure of the oxygen is less than about $6\times10^{-5}$ mm. of mercury, the amount of oxygen incorporated into the copper film is so low that the conductivity of the later formed cuprous iodide or cuprous sulfide film does not have the desired increase in conductivity. If the partial pressure of the oxygen exceeds substantially $1\times10^{-2}$ mm. of mercury, for example $1\times10^{-1}$ mm. of mercury, actual oxidation of the copper occurs with the formation of a sooty film of copper oxides which does not form the desirable electrically conductive film when treated to form the cuprous iodide or cuprous sulfide layer. In the formation of the cuprous sulfide or cuprous iodide, the oxygen remains within the coating and, it is believed, creates crystal defects which would account for the increased conductivity.

The substrate on which the copper film containing oxygen is deposited may be any solid substrate, for example, a metal, glass, ceramic, thermosetting or thermoplastic resin, natural and synthetic fibers in fibrous, woven or matted form, cellulosic compositions such as paper, regenerated cellulose, naturally occurring products, for example, wood, leather, minerals, etc. and may include synthetically produced minerals, in crystalline or amorphous form, especially those crystalline types of materials used in electronic and optical applications, for example, as piezoelectric crystals, optical prisms, mirrors, etc. Since the condensation of the copper does not substantially heat the substrate, materials which are temperature sensitive, for example, paper, regenerated cellulose, synthetic plastics, especially those of the thermoplastic type, may be readily coated by condensation techniques, and the copper containing oxygen film thereafter converted to cuprous iodide by treatment with iodine or hydrogen iodide vapors, or to cuprous sulfide by the treatment with sulfur or hydrogen sulfide vapors.

Since these coatings are transparent, especially in the form of thin films, they may be deposited on transparent substrates, for example, glass, quartz crystals, transparent synthetic plastics, for example, polymers and copolymers of styrene, methyl methacrylate, vinyl chloride, diallyl methacrylate, etc., to form an invisible, electrically conductive coating on the substrate, due precautions being taken to obtain the proper thickness of film so that interference due to reflection is not obtained. In many applications, however, transparency is not necessary and the coating may be any desired thickness.

Referring now to FIG. 1, there is shown a typical vacuum apparatus 10 consisting of a bell jar 11 which is conveniently made of glass to permit visual observations, resting on base plate 12 conveniently constructed of an insulating material, for example, a phenolic laminate. The junction between bell jar 11 and base plate 12 is suitably gasketed with gasket 13 which is preferably recessed into base plate 12 and may be conveniently constructed of any resilient material, for example, natural or synthetic rubber, neoprene, silicone rubber, etc., or the mating surfaces of bell jar 11 and base plate 12 may be ground optically flat so that the bell jar may be hermetically sealed to base plate 12 by mere use of a vacuum grease. Base plate 12 is equipped with outlet 14 which is connected to the vacuum pump system, not shown. If the base plate 12 is made of an electrical conductor, for example, steel, electrodes 15 must be electrically insulated from base plate 12 by means of a suitable insulating composition, for example, glass. The ends of electrodes 15 within the bell jar are connected to heater 16 by any suitable means, for example, by screw or spring clamps. Inlet 17 is hermetically sealed to silver tube 18 by, for example, a gasketed flange, brazing, etc. Tube 18 is surrounded by heater 19. In operation, the substrate 20 to be coated is placed on supports 21, either above or below heater 16 and a quantity of copper, which may be in wire or other solid form, is inserted within the coils of heater 16, or may be coated or otherwise distributed on the surface of the coils of heater 16. The substrate 16 may be suitably masked, if desired, to produce a pattern, for example, an electrical circuit element, etc. The vacuum pump system is energized and as complete a vacuum established within the bell jar as possible, usually at least $5\times10^{-5}$ mm. of mercury. Heater 19 is then energized, which permits oxygen but not the balance of the constitutents of air to diffuse through the silver tube, establishing an oxygen atmosphere within the bell jar. The amount of oxygen diffusing through the silver tube may be controlled by well known techniques, for example, by the dimensions of the silver tube or the temperature to which the silver tube 18 is heated by heater 19. The partial pressure within the bell jar is controlled either by the pumping rate of the vacuum system or by the amount of oxygen permitted to diffuse through tube 18, or by a combination of both. The partial pressure of oxygen will of course be determined by the vacuum on the system, which is conveniently read from the gauge (not shown) in the piping leading to the vacuum pump system. In carrying out my process, the oxygen partial pressure is controlled within the desired range of $6\times10^{-5}$ to $1\times10^{-2}$ mm. of mercury. At this point, the heater 16 is electrically energized to cause the copper to melt and preferably to completely wet the surface of heater 16 although it may cling in droplets to the loops of the heater. This initial heating is carried out carefully, so as to avoid rapid bubbling due to occluded gases released as the copper melts, which could result in loss of some copper being expelled from the heater, and therefore not available for vaporization. Alternatively, the coil of heater 16 may be precoated with copper, for example, as described in Example 1. An electrical potential supplied to heater 16 is increased, for example by means of a variable transformer, until the temperature of the heater 16 is sufficiently high to cause the copper to be evaporated from the coil at which point it coats the interior and contents of the entire bell jar including substrate 20, which are in an unobstructed line of sight of the copper source. Knowing the dimensions of the various objects, it is usually easy to calculate the amount of copper placed in heater 16 to form the desired thickness upon substrate 20. Further details of the formation of copper films, but not including the admission of oxygen into the vaporization chamber are disclosed in the literature, for example, in the above-named references.

The controlled admission of oxygen into the evacuation chamber may be accomplished by any suitable means. The use of a heated silver tube is the most convenient since it permits the use of surrounding air to be used as the source of oxygen and selectively transmits only the oxygen of the air through the tube. The effect of the thickness and surface area of the walls of the tube and the temperature to which the tube is heated, on the rate of diffusion of oxygen into the vacuum chamber are readily available. For example, see "Diffusion of Oxygen Through Silver" by Leo Spencer, J. Am. Chem. Soc., 123, 2124 (1923), and "Diffusion of Oxygen Through Silver" by F. M. G. Johnson and P. La Rose, J. Am. Chem. Soc., 46, 1377 (1924). Alternatively, a source of oxygen at higher concentrations than available in air may be supplied, and under pressure, if desired, to increase the flow of oxygen through the silver tube, or a controlled leak by, for example, valving, may be used to admit oxygen from an oxygen source at any desired rate, to obtain the desired partial pressure of oxygen in the vacuum chamber, and is readily determined, as mentioned previously, by having a vacuum gauge connected to the vacuum system.

Either by visual examination, previous experience, or by use of a photocell, it is possible to continue the condensation of copper until the desired thickness of copper coating is obtained on the substrate. After the desired thickness of the coating is obtained, the power to heater 16 and if desired, heater 19, is turned off. Preferably, heater 16 is allowed to cool to a temperature where it will not be affected by the inlet air when the vacuum is released from the vacuum chamber and the substrate 20 with its copper coating is removed. The copper coating is converted to cuprous iodide by placing in a chamber containing iodine vapors or hydrogen iodide vapors or to cuprous sulfide by placing in a chamber containing hydrogen sulfide or sulfur vapors. Such chambers may be any container, covered if desired, containing a source of iodine, hydrogen iodide, sulfur or hydrogen sulfide vapors which can be suitably supplied either directly as the gas, formed from the solid or liquid contained in the chamber, or a connected supply source may be used. Iodine, for example, can be placed in the bottom of a suitable container and will autogeneously supply iodine vapors even at room temperature although a higher concentration of iodine vapors may be obtained by heating to increase the vapor pressure of iodine vapors over the solid iodine. The same is true for sulfur which also is a solid at room temperature. Hydrogen iodide and hydrogen sulfide being gases may be supplied either from a generator or from a cylinder containing these gases under pressure.

I have found that for the formation of copper iodide films iodine vapors and that for the formation of cuprous sulfide, hydrogen sulfide gives a more rapid conversion of the copper coating, and are therefore preferred over the use of hydrogen iodide or sulfur.

In order that those skilled in the art may better understand my invention, the following examples are given by way of illustration and not by way of limitation.

EXAMPLE 1

In a series of runs, two pieces of thermoplastic polymer substrate of a polycarbonate known as poly-[di(p-phenylene)-dimethylmethylenecarbonate] were coated with copper in an oxygen atmosphere under vacuum where the partial pressure of the oxygen used in each run is shown in Table I. The apparatus used was that essentially as shown in FIG. 1, with the copper being evaporated from a heater prepared as follows: a 30 mil molybdenum wire 15 inches long which was overwound with 5 mil molybdenum wire with the turns spaced 5 mils apart was overwound with 8 to 9 ft. of copper wire over the center 11 inches, so that the loops of copper wire lay between the loops of 5 mil molybdenum wire. This assembly was coiled on a 1/4 inch mandrel for the length covered by the copper wire, and heated in a hydrogen atmosphere until the copper melted and coated the molybdenum.

After cooling, the coil was removed from the hydrogen atmosphere and attached to the electrodes in the coating apparatus. In each run, two strips of the polymeric substrate to be coated were mounted horizontally and supported 6 inches below the heater. At the same time a glass plate was supported vertically 6 inches from the side of the heater. The bell jar was put in place and a vacuum of $5\times10^{-5}$ mm. of Hg established. The heater surrounding the silver tube which in this case was a silver tube closed at one end to form a thimble approximately 12 inches long, 1/8 inch in diameter and having a 12 mil wall, was heated in the range of 575 to 600° C. At this temperature the oxygen diffusing through the silver tube replaced the residual gas in the bell jar with oxygen but the vacuum pumps were capable of still maintaining a vacuum of $6\times10^{-5}$ mm. of mercury. The higher partial pressures of oxygen were obtained by throttling the pumping capacity of the pumps by partially closing a valve in the piping connecting the vacuum pumps to the bell jar. After the desired partial pressure of oxygen was established, the current was turned on to the heater within the bell jar and the voltage gradually increased by means of a variable transformer until evaporation of the copper from the filament produced the desired thickness of coating which was the same on the thermoplastic substrate as on the glass substrate, since the amount of copper deposited in a given time is determined by the distance the object to be coated lies from the source of copper. In this example, the amount of copper condensed on the substrate in each run was such that the light transmission through the glass plate was reduced to 5% of the value of the uncoated glass plate. This took about 5 minutes. Continuous measurement of the amount of copper deposited was obtained by including a photocell aimed at the glass plate behind which was placed a light source in the bell jar. Both the photocell and light source were shielded to prevent copper from depositing on them. After removal from the vacuum apparatus, both the copper coated glass plate and the two copper coated thermoplastic substrates were placed in a closed container heated to 70° C. having solid iodine in equilibrium with iodine vapors. In about 5 seconds the copper was converted to a transparent coating of cuprous iodide on both the glass plate and the thermoplastic substrates. The D.C. surface resistivity of these films was measured. The results are given in Table I. The thickness of the films was measured by well known techniques using the color of the films under reflected light and was found to vary from the edge to the center of the samples with the thicker coating being in the center of the sample which was nearest to the source of copper during the coating operation. It was found that the resistivity was the same for the coatings on glass and the thermoplastic substrate. Conductivity was calculated as the reciprocal of the product of the resistivity multiplied by the thickness in centimeters.

*Table I*

COATING THICKNESS 1,400 A

| Oxygen Pressure, mm. of Hg | Resistivity, ohms/square | Conductivity, per ohm-cm. |
|---|---|---|
| $1.0\times10^{-2}$ | 1,900 | 38 |
| $1.0\times10^{-3}$ | 2,600 | 28 |
| $1.5\times10^{-4}$ | 3,100 | 23 |
| $6.0\times10^{-5}$ | 4,000 | 18 |

COATING THICKNESS 1,050 A

| | | |
|---|---|---|
| $1.0\times10^{-2}$ | 2,500 | 38 |
| $1.0\times10^{-3}$ | 3,300 | 29 |
| $1.5\times10^{-4}$ | 4,100 | 23 |
| $6.0\times10^{-4}$ | 4,550 | 21 |

From the results of these tests, it is seen that the resistivity decreases as the partial pressure used during evaporation of the copper film increases, and also increases as the thickness of the film increases. However, when the resistivity values are converted into conductivity, it is found that the conductivity values are independent of film thickness and are only dependent on the partial pressure of oxygen in the vacuum apparatus during the formation of the copper coating. These resistivity values are approximately 1/5 of the values and the conductivity approximately five times greater than the values obtained when the copper is evaporated without the admission of oxygen into the vacuum atmosphere. Similar results were obtained when hydrogen iodide vapors were used in place of iodine to produce the cuprous iodide coating.

In addition to the decreased resistivity, these conductive coatings are stabilized with regard to transparency with highest stability being obtained with the films formed from copper laid down under the highest partial pressure of oxygen. For example, after 10 months the cuprous iodide coatings made from copper condensed in oxygen at a partial pressure of $1\times10^{-2}$ mm. of mercury were still clear and transparent, while the other films had become somewhat cloudy with the greatest cloudiness being shown in the coating of cuprous iodide which had been prepared from copper condensed in oxygen at a partial pressure of $6\times10^{-5}$ mm. of mercury. The amount of cloudiness developed in the coatings of cuprous iodide prepared from copper condensed in oxygen at a partial pressure of $6\times10^{-5}$ after 10 months was approximately the same cloudiness that would have developed in a period of from several weeks to a month in a cuprous iodide coating prepared from copper evaporated without the admission of oxygen into the vacuum chamber. Although this cloudiness affects the clarity of the coatings, it has only a small effect on the electrical conductivity. This slight decrease in electrical conductivity is no greater in the films which became cloudy than in the films which remained clear over the 10-month period.

EXAMPLE 2

Using the same general procedure as described in Example 1, copper was condensed onto two samples of the polymeric substrate used in Example 1, as well as upon a glass plate until the light transmission of the coated substrates was only 20% of the same substrate without a coating. In one case, no oxygen was admitted during the evaporation of oxygen, and in the other case a partial pressure of oxygen of $5\times10^{-3}$ mm. of mercury was used. In all six samples, the copper was converted to cuprous sulfide by exposing the copper to hydrogen sulfide vapors at a pressure of 1 atmosphere at 100° C. until the coatings became transparent. In the case of the copper coatings formed without the admission of oxygen, it took 30 minutes for the copper to be converted to a transparent cuprous sulfide coating, whereas it took only 3 minutes for the copper which had been condensed at an oxygen partial pressure of $5\times10^{-3}$ mm. of mercury to become transparent. One sample of the cuprous sulfide coating on the polymeric substrate from each run was stored in a desiccator for 2 days and the other sample was stored for 6 days in ambient air. The resistivity of the cuprous sulfide coatings stored in the desiccator was 400 ohms/square for the cuprous sulfide coating formed from the copper which had been condensed without the admission of oxygen, and 225 ohms/square for the cuprous sulfide coating prepared from the copper which had been condensed at an oxygen partial pressure of $5\times10^{-3}$ mm. of mercury. The corresponding values for the samples which had been stored for 6 days in ambient air were 100 and 50 ohms/square, respectively. Similar results may be obtained by using sulfur vapors in place of the hydrogen sulfide to convert the copper coatings to cuprous sulfide.

The coatings prepared by my process have a wide variety of applications, for example, in making electrical heating elements on non-conductive substrates, or may be incorporated in sandwich-type structures for electronic applications at cryogenic temperatures when placed on substrates which become superconductors, or may be used in cold cathode applications when placed on metallic substrates which themselves are good electrical conductors at room temperature.

In order to protect the electrically conductive coatings, they may be coated with protective layers, for example, lacquers, varnishes, synthetic resins, etc.

These and other modifications as well as other specific uses for the coated articles of this invention will be apparent to those skilled in the art, without departing from my invention in its broader aspects, and I aim therefore in the appended claims to cover all such changes and modifications as fall within the true spirit and scope of my invention.

What I claim as new and desire to secure by Letters Patent of the United States is:

1. The process of producing an electrically conductive coating on a solid substrate which comprises (*a*) vaporizing metallic copper, (*b*) condensing the copper vapors on the solid substrate, the steps of (*a*) and (*b*) being carried out in an oxygen atmosphere under vacuum in which the oxygen partial pressure is maintained in the range of about $6\times10^{-5}$ mm. to $1\times10^{-2}$ mm. of mercury, and (*c*) thereafter converting the copper on the substrate to a compound selected from the group consisting of cuprous iodide and cuprous sulfide.

2. The process of producing an electrically conductive coating on a solid substrate which comprises (*a*) vaporizing metallic copper, (*b*) condensing the copper vapors on the solid substrate, the steps of (*a*) and (*b*) being carried out in an oxygen atmosphere under vacuum in which oxygen partial pressure is maintained in the range of about $6\times10^{-5}$ mm. to $1\times10^{-2}$ mm. of mercury, and (*c*) thereafter converting the copper on the substrate to cuprous iodide.

3. The process of producing an electrically conductive coating on a solid substrate which comprises (*a*) vaporizing metallic copper, (*b*) condensing the copper vapors on the solid substrate, the steps of (*a*) and (*b*) being carried out in an oxygen atmosphere under vacuum in which the oxygen partial pressure is maintained in the range of about $6\times10^{-5}$ mm. to $1\times10^{-2}$ mm. of mercury, and (*c*) thereafter converting the copper on the substrate to cuprous sulfide.

4. The process of producing a metallic copper coating on a solid substrate which comprises (*a*) vaporizing metallic copper, and (*b*) condensing the copper vapors on the substrate, the steps of (*a*) and (*b*) being carried out in an oxygen atmosphere under vacuum in which the oxygen partial pressure is maintained in the range of about $6\times10^{-5}$ mm. to $1\times10^{-2}$ mm. of mercury.

5. A conductive coating of improved electrical conductivity selected from the group consisting of cuprous iodide and cuprous sulfide on a solid substrate, said coating having oxygen incorporated within the coating.

6. The product of claim 5 wherein the conductive film is cuprous iodide.

7. The product of claim 5 wherein the conductive film is cuprous sulfide.

References Cited in the file of this patent

UNITED STATES PATENTS

| | | |
|---|---|---|
| 2,756,165 | Lyon | July 24, 1956 |
| 2,932,592 | Cameron | Apr. 12, 1960 |